United States Patent [19]

Naito et al.

[11] Patent Number: 4,671,468
[45] Date of Patent: Jun. 9, 1987

[54] WEBBING GUIDE DEVICE

[75] Inventors: Katsumi Naito; Hironobu Imai, both of Kanagawa, Japan

[73] Assignee: NSK-Warner K.K., Tokyo, Japan

[21] Appl. No.: 783,345

[22] Filed: Sep. 27, 1985

[30] Foreign Application Priority Data

Jan. 26, 1985 [JP] Japan .............................. 60-8660[U]

[51] Int. Cl.$^4$ ............................................. B60R 22/00
[52] U.S. Cl. .................................... 242/76; 242/107; 280/808
[58] Field of Search ......... 242/107, 107.4 R, 107.4 E, 242/76; 280/808; 297/483; 226/196, 197, 199

[56] References Cited

U.S. PATENT DOCUMENTS

| 4,264,089 | 4/1981 | Maekawa et al. | 280/803 |
| 4,378,947 | 4/1983 | Fohl | 280/808 |
| 4,508,286 | 4/1985 | Seifert et al. | 242/107 |
| 4,550,933 | 11/1985 | Patterson | 297/483 X |

FOREIGN PATENT DOCUMENTS

| 2537437 | 2/1977 | Fed. Rep. of Germany . |
| 2553804 | 6/1977 | Fed. Rep. of Germany ...... 297/483 |
| 2607170 | 9/1977 | Fed. Rep. of Germany . |
| 2711401 | 9/1978 | Fed. Rep. of Germany ...... 297/483 |

Primary Examiner—John M. Jillions
Attorney, Agent, or Firm—Wegner & Bretschneider

[57] ABSTRACT

A webbing guide device suitable for use in a vehicle seat belt system is disclosed. Both end portions of a rod-like member defining an annular webbing through portion, through which a webbing is allowed to extend, are overlapped with a slit formed therebetween with a clearance sufficient to permit insertion of the webbing from the outside into the through portion therethrough. At least one pair of holes are respectively formed in a face-to-face relation through the end portions so as to allow a fastening member to extend therethrough upon mounting the guide device. Owing to the provision of the slit, a previously-mounted webbing guide device can be replaced by the webbing guide device without need for removal of its associated seat belt system from the vehicle. Both end portions may define two or more pairs of holes for mounting the guide device at a suitable position in accordance with the physical constitution or the like of each user.

5 Claims, 6 Drawing Figures

WEBBING GUIDE DEVICE

BACKGROUND OF THE INVENTION (1) Field of the Invention:

This invention relates to a webbing guide device for allowing a webbing to extend therethrough while supporting the webbing and deflecting the direction of extension of the webbing in a seat belt system of a vehicle. Specifically, it relates to a webbing guide device permitting its replacement for a previously-mounted webbing guide device without need for removal of the associated seat belt system from the vehicle and at the same time, facilitating the adoption of such a design that its mounting position on the associated vehicle can be suitably selected.

(2) Description of the Prior Art:

There have conventionally been known webbing guide devices equipped with webbing through portions, through which webbings are allowed to extend, and mounting portions at which the webbing guide devices are secured to vehicles. Due to a structural limitation common to the previously-proposed various webbing guide devices that all of them were formed in loop-like configurations, it was impossible to replace webbing guide devices, which had already been mounted on their associated vehicles, with fresh webbing guide devices without removing the corresponding seat belt systems from the vehicles; or their mounting positions to the associated vehicles were limited and it was thus practically impossible to design them in such a way that they could be secured at suitable positions in accordance with the physical constitutions of their users.

SUMMARY OF THE INVENTION

An object of this invention is thus to provide a seat belt guide device which can solve the above-described problems by a simple structure.

In one aspect of this invention, there is thus provided a webbing guide device characterized in that both end portions of a rod-like member defining an annular webbing through portion, through which a webbing is allowed to extend, are overlapped with a slit formed therebetween with a clearance sufficient to permit insertion of the webbing from the outside into the through portion therethrough, and at least one pair of holes are respectively formed in a face-to-face relation through the end portions so as to allow a fastening member to extend therethrough upon mounting the guide device.

In another aspect of this invention, there is also provided a webbing guide device characterized in that both end portions of a rod-like member defining an annular webbing through portion, through which a webbing is allowed to extend, are overlapped with a slit formed therebetween with a clearance sufficient to permit insertion of the webbing from the outside into the through portion therethrough, and plural pairs of holes are respectively formed in face-to-face relations through the end portions so as to allow a fastening member to extend through a desired one pair of the holes upon mounting the guide device. In one embodiment, the plural pairs of holes are longitudinally overlapped in the respective end portions so as to define slots having wave-like longitudinal edges.

Owing to the provision of the slit for the passage of its associated webbing therethrough, it is possible to replace a previously-mounted webbing guide device by a webbing guide device of this invention without removing the associated seat belt system from the vehicle. Where a conventional webbing guide device has been used, it is cut by suitable means such as a wire cutter or the like to open its closed ring. Then, the associated webbing is taken out and the webbing guide device is removed from the vehicle. If a webbing mounting device of this invention has been used, the associated webbing is removed through its slit formed between its both end portions. After inserting the webbing into a fresh webbing guide device of this invention through its slit and allowing the webbing to extend through its webbing through portion, the fresh webbing guide device is mounted on the vehicle with ease. It is thus possible to replace an old webbing guide device by a fresh webbing guide device of this invention without removing the seat belt system from the vehicle no matter whether the old webbing guide device is a conventional webbing guide device or a webbing guide device of this invention. Needless to say, it is much easier to make the above replacement if the old webbing guide device is also a webbing guide device according to this invention. Here, by making a simple design change such as formation of plural pairs of holes through both end portions, the mounting position of the webbing guide device can be adjusted to a position more suitable for the corresponding occupant and at the same time, the mounting of the webbing guide device is facilitated. These features are advantageous from the economical viewpoint.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
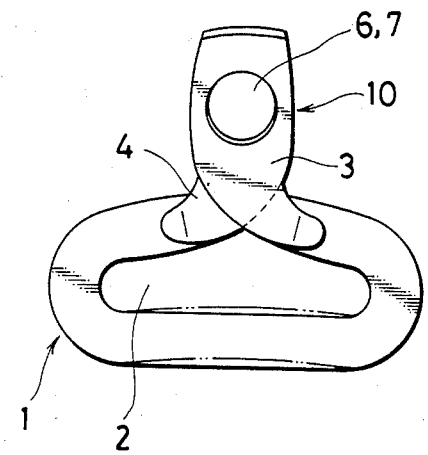
FIG. 1 is a front view of a webbing guide device according to the first embodiment of this invention.
Figure 2:
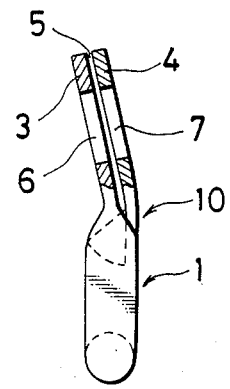
FIG. 2 is a simplified side view of the webbing guide device.
Figure 3:
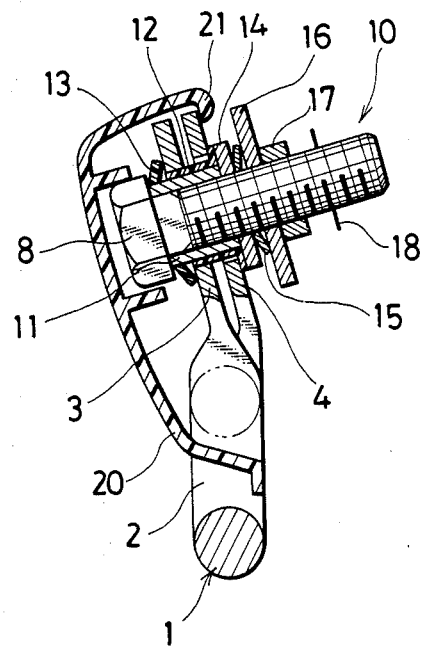
FIG. 3 is a detailed side view of the webbing guide device.

Referring first to FIGS. 1 through 3, the webbing guide device according to the first embodiment of this invention will be described. A rod-like member 1 is bent into a horizontally-long annular configuration so that a webbing through portion 2 is formed. Both end portions 3,4 of the rod-like member 1 are flattened and overlapped at a location centrally above the through portion 2 and extend out upwardly from the through portion 2. Between both end portions 3,4 which extend in a face-to-face relation, a slit 5 is formed with a clearance sufficient for the insertion of a webbing (not illustrated) from the outside into the through portion 2 therethrough. A pair of holes 6,7 are respectively formed in a face-to-face relation through the opposing end portions 3,4. A fastening member such as an anchor bolt 8 is caused to extend through the holes 6,7 so as to mount the webbing guide device to a suitable position of a vehicle. Incidentally, a lower portion of the rod-like member 1 which defines a lower part of the through portion 2 may preferably be slightly bent upwardly as indicated by phantom lines in FIG. 1.

The webbing guide device of the first embodiment will next be described in further detail with reference to FIG. 3, in which the anchor bolt 8 extends through the opposing holes 6,7 with a collar 11 and bushing 12 interposed therebetween. Furthermore, the anchor bolt 8 extends through a dished washer 13, plain washer 14, dome-type shakeproof lock washer 15, another plain washer 16, collar 17 and fiber washer 18. In cooperation with these collars and washers, the anchor bolt 8 secures the device firmly on the vehicle. Extending over both end portions 3,4, anchor bolt 8 and an upper part of the through portion 2, a cover 20 is attached with its hook portion 21 fit on the upper extremity of the end portion 4.

Figure 4:
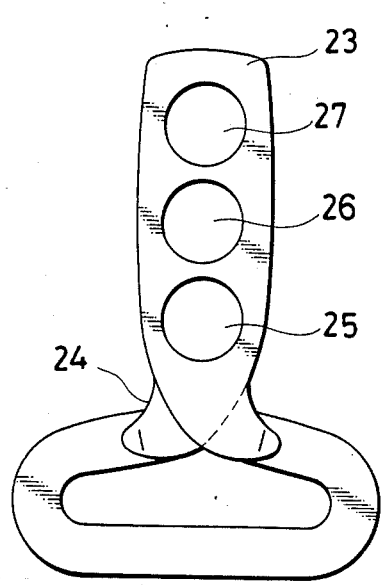
FIG. 4 is a front view of a webbing guide device according to the second embodiment of this invention.
Figure 5:
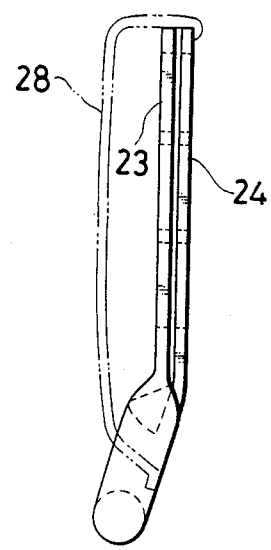
FIG. 5 is a simplified side view of the webbing guide device of FIG. 4.

Referring next to FIGS. 4 and 5, the webbing guide device according to the second embodiment of this invention will be described.

In the second embodiment, both end portions 23,24 extend much longer than their corresponding end portions 3,4 in the webbing guide device of the first embodiment. Through both end portions 23,24, three pairs of holes 25,26,27 are formed. Therefore, a fastening member is caused to extend selectively through a desired one pair of the holes so that the device can be mounted at a suitable position in accordance with the physical constitution or the like of each user. Reflecting the elongated configurations and dimensions of both end portions 23,24, a cover 28 is also elongated. The other elements of the structure are the same as their corresponding elements in the first embodiment.

Adoption of a structure similar to that of the second embodiment makes it possible to avoid development of such dangers that the associated shoulder webbing is slipped off from the shoulder of the corresponding occupant and in the event of a vehicle collision, the shoulder webbing is twisted and its restraining performance is hence impaired (when the occupant has a great sitting height); and the shoulder webbing is brought into contact with the neck and face area of its user upon wearing the seat belt system (when the user is short).

Figure 6:
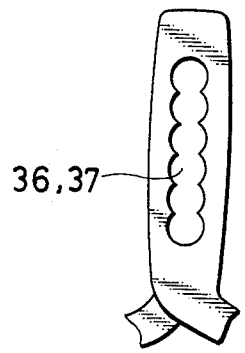
FIG. 6 is a fragmentary front view of a webbing guide device according to the third embodiment of this invention.

FIG. 6 illustrates the third embodiment of this invention, in which a pair of slots 36,37 having wavelike longitudinal edges are respectively formed by longitudinally-overlapped circular holes. In the third embodiment, its fastening member can also extend selectively through one of a plurality of points (6 points). The webbing guide device of the third embodiment can thus bring about the same effects as the webbing guide device of the second embodiment.

Having now fully described the invention, it will be apparent to one of ordinary skill in the art that many changes and modifications can be made thereto without departing from the spirit or scope of the invention as set forth herein.

What is claimed is:

1. A webbing guide device comprising a rod-like member having two end portions, both end portions of said rod-like member being overlapped to define webbing through portion, through which a webbing is allowed to extend, said overlapped end portions being normally spaced apart a distance sufficient to permit insertion of the webbing from the outside into the through portion therethrough, and at least one pair of holes are respectively formed in a face-to-face relation through the end portions so as to allow a fastening member to extend therethrough for mounting the guide device.

2. A webbing guide device as claimed in claim 1, wherein both end portions are flattened.

3. A webbing guide device as claimed in claim 1, wherein the both end portions extend out from the webbing through portion.

4. A webbing guide device comprising a rod-like member having two end portions, both end portions of said rod-like member being overlapped to define an annular webbing through portion, through which a webbing is allowed to extend, said overlapped end portions being normally spaced apart a distance sufficient to permit insertion of the webbing from the outside into the through portion therethrough, and plural pairs of holes are respectively formed in face-to-face relation through the end portions so as to allow a fastening member to extend through a desired one pair of the holes for mounting the guide device.

5. A webbing guide device as claimed in claim 4, wherein the plural pairs of holes are longitudinally overlapped in the respective end portions so as to define slots having wave-like longitudinal edges.

* * * * *